(12) United States Patent
Luttinen et al.

(10) Patent No.: US 9,216,624 B1
(45) Date of Patent: Dec. 22, 2015

(54) FRONT SUSPENSION ASSEMBLY AND A SUSPENSION SYSTEM FOR A VEHICLE

(71) Applicant: GM GLOBAL TECHNOLOGY OPERATIONS LLC, Detroit, MI (US)

(72) Inventors: James L. Luttinen, Brighton, MI (US); Jeffry Pniewski, Dryden, MI (US); Steven A. Lamouria, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/335,384

(22) Filed: Jul. 18, 2014

(51) Int. Cl.
*B60G 3/20* (2006.01)
*B60G 21/00* (2006.01)

(52) U.S. Cl.
CPC ............... *B60G 3/20* (2013.01); *B60G 21/007* (2013.01); *B60G 2200/18* (2013.01)

(58) Field of Classification Search
CPC . B60G 3/20; B60G 2200/184; B60G 2200/18
USPC .................... 280/124.135, 124.143
See application file for complete search history.

(56) References Cited

U.S. PATENT DOCUMENTS

| | | | |
|---|---|---|---|
| 4,863,188 A * | 9/1989 | Killian .................... | 280/124.138 |
| 7,048,286 B2 | 5/2006 | Eppelein | |
| 7,891,684 B1 | 2/2011 | Luttinen et al. | |
| 2009/0218783 A1* | 9/2009 | Brandl et al. .......... | 280/124.135 |

* cited by examiner

*Primary Examiner* — Keith Frisby
(74) *Attorney, Agent, or Firm* — Quinn Law Group, PLLC

(57) ABSTRACT

A front suspension assembly and a front suspension system for a vehicle are disclosed. A tire includes an outer surface having a contact patch center point being a point on a tire center axis. A first handling link and a first ride link are coupled to a wheel carrier above a first plane. A second handling link and a second ride link are coupled to the wheel carrier below the first plane. A handling axis intersects both of a first and second distal end of the first and second handling links respectively. A ride axis intersects both of a third and fourth distal end of the first and second ride links respectively. At least one of the first and second ride links is disposed offset from respective first and second handling links to minimize a lateral distance between the handling and ride axes along the ground plane.

18 Claims, 3 Drawing Sheets

FRONT SUSPENSION ASSEMBLY AND A SUSPENSION SYSTEM FOR A VEHICLE

TECHNICAL FIELD

The present disclosure relates to a suspension system for a vehicle.

BACKGROUND

Vehicles have been developed having a suspension system. Roads can have bumps or holes and when a vehicle travels over a bump or hole, the suspension system can dampen movement of a sprung mass of the vehicle which provides a smoother ride.

There are different types of suspension systems, such as for example, short-long arm suspension systems and multi-link strut suspension systems. The short-long arm suspension system utilizes an upper control arm disposed above, and shorter than, a lower control arm. The upper and lower control arms are coupled to a steering knuckle by an upper ball joint and a lower ball joint. The multi-link strut suspension system utilizes a single upper strut mount and a pair of lower links which are coupled to a steering knuckle by ball joints.

SUMMARY

The present disclosure provides a front suspension assembly for a vehicle. The assembly includes a tire rotatable about a first axis. A tire center axis is disposed through the tire perpendicular to the first axis. The tire includes an outer surface having a contact patch center point being a point on the tire center axis. A ground plane intersects the contact patch center point transverse to the tire center axis. The assembly also includes a wheel carrier supporting the tire. A first plane intersects the wheel carrier horizontally through the first axis. The assembly further includes a first handling link and a second handling link. The first handling link includes a first distal end coupled to the wheel carrier above the first plane. The second handling link includes a second distal end coupled to the wheel carrier below the first plane. A handling axis intersects both of the first and second distal ends of the first and second handling links respectively. The assembly also includes a first ride link and a second ride link. The first ride link includes a third distal end coupled to the wheel carrier above the first plane. The second ride link includes a fourth distal end coupled to the wheel carrier below the first plane. A ride axis intersects both of the third and fourth distal ends of the first and second ride links respectively. At least one of the first and second ride links is disposed offset from respective first and second handling links to minimize a lateral distance between the handling and ride axes along the ground plane where the handling and ride axes intersect the ground plane.

The present disclosure also provides a front suspension system for a vehicle. The system includes a first suspension assembly and a second suspension assembly spaced from the first suspension assembly. Each of the first and second suspension assemblies includes, respectively, the tire, the handling links and the ride links as discussed immediately above. At least one of the first and second ride links is disposed offset from respective first and second handling links to minimize a lateral distance between the handling and ride axes along the ground plane where the handling and ride axes intersect the ground plane.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that terms such as "above", "below", "upward", "up", "downward", "down", "top", "bottom", "left", "right", etc., are used descriptively for the figures, and do not represent limitations on the scope of the disclosure, as defined by the appended claims. Furthermore, the term "substantially" can refer to a slight imprecision or slight variance of a condition, quantity, value, or dimension, etc.

Figure 1:
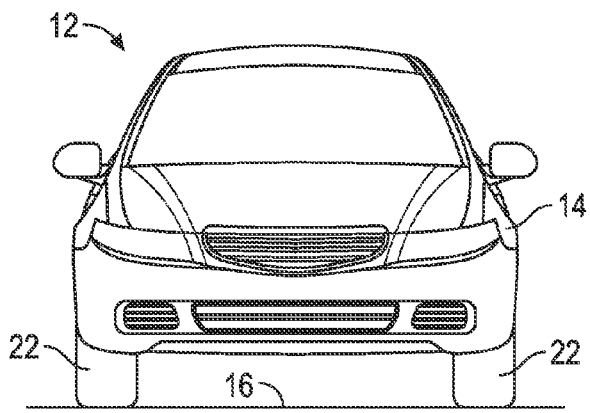
FIG. 1 is a schematic front view of a vehicle.
Figure 2:
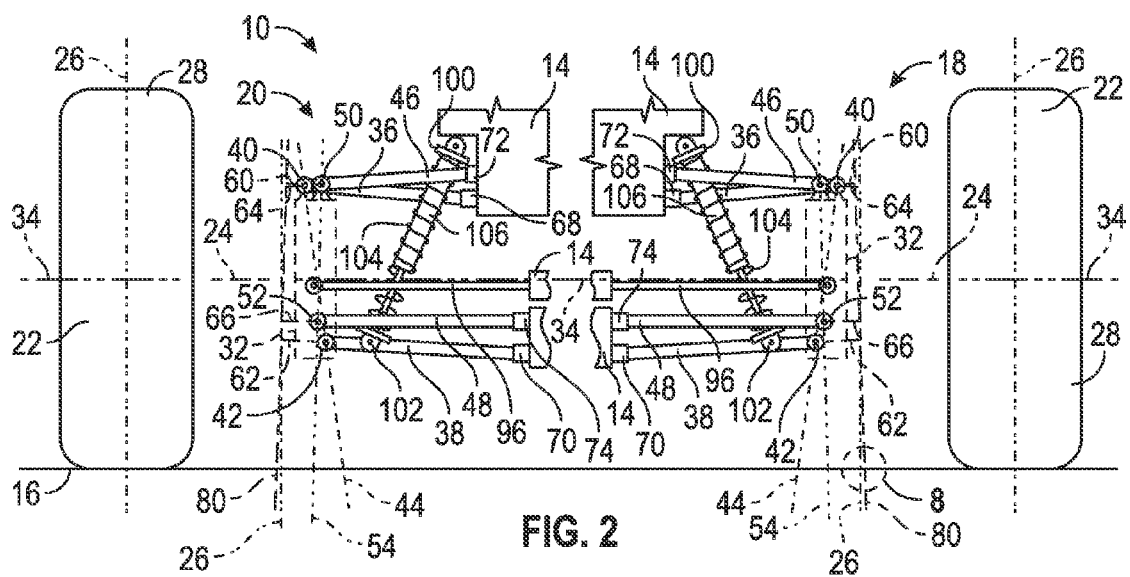
FIG. 2 is a schematic front view of a front suspension system including a first suspension assembly and a second suspension assembly, with a pair of tires exploded from respective assemblies.

Referring to the Figures, wherein like numerals indicate like or corresponding parts throughout the several views, a front suspension system 10 for a vehicle 12 is generally shown in FIGS. 1 and 2.

The vehicle 12 can be an automotive vehicle, such as, a car, a sports car, a truck, etc. Furthermore, the vehicle 12 can be a hybrid vehicle utilizing an internal combustion engine and one or more motor-generators. Additionally, the vehicle 12 can be an electric vehicle utilizing one or more motor-generators and eliminating the internal combustion engine. As another example, the vehicle 12 can be a vehicle utilizing the internal combustion engine and eliminating the motor-generator(s). It is to be appreciated that the vehicle 12 can alternatively be a non-automotive vehicle.

Referring to FIGS. 1 and 2, the vehicle 12 includes a structure 14. The front suspension system 10 supports the structure 14 and the structure 14 is spaced from a ground plane 16, in which a road or the ground can align with the ground plane 16. The structure 14 can be one or more of: a chassis, a support structure, a frame, a subframe, a body, a brace, a panel, an outer skin, etc. The structure 14 can be any suitable configuration. Additionally, the structure 14 can be any component of a sprung mass of the vehicle 12, including
} the body, the frame, the subframe, the chassis, the outer skin, or any load-bearing component which is supported by the front suspension system 10.

The front suspension system 10 can dampen movement of the structure 14 as the vehicle 12 travels over the road, represented by the ground plane 16, to provide a smoother ride. As best shown in FIG. 2, the front suspension system 10 includes a first suspension assembly 18 and a second suspension assembly 20 spaced from the first suspension assembly 18. The first and second suspension assemblies 18, 20 cooperate together to dampen movement of the structure 14. The components of the first and second suspension assemblies 18, 20 are substantially the same with the difference being the assemblies 18, 20 are disposed at opposite sides of the vehicle 12. Therefore, the first suspension assembly 18 can be for the front driver's side of the vehicle 12 and the second suspension assembly 20 can be for the front passenger's side of the vehicle 12. Due to the similarities of these assemblies 18, 20, only the components of one side of the front suspension system 10 are discussed in detail below.

Figure 3:
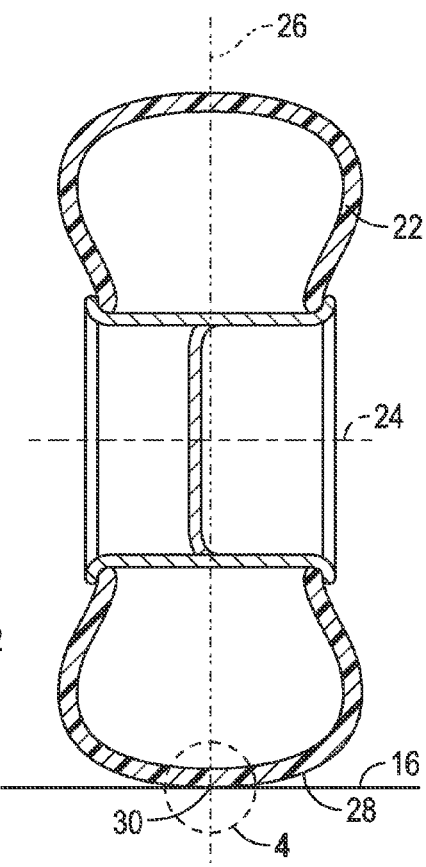
FIG. 3 is a schematic cross-sectional view of a rim and a tire.

The first suspension assembly 18 referred to above can also be referred to as a front suspension assembly. Referring to FIG. 3, the first suspension assembly 18 includes a tire 22 rotatable about a first axis 24. A tire center axis 26 is disposed through the tire 22 perpendicular to the first axis 24, and thus, the tire center axis 26 is in a vertical plane. The tire center axis 26 can be disposed through a center of the tire 22 as shown in FIG. 3.

Figures 4, 8:
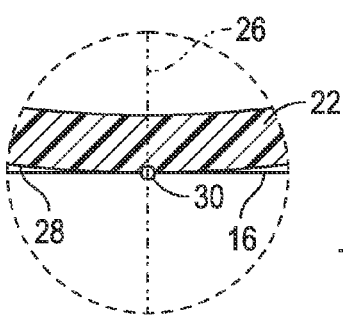
FIG. 4 is a schematic enlarged cross-sectional view of the tire taken from the circled area labeled 4 in FIG. 3.
FIG. 8 is a schematic enlarged view of an imaginary steer axis and a tire center axis projecting through the ground plane to identify a scrub radius, which is taken from the circled area labeled 8 in FIG. 2.

The tire 22 includes an outer surface 28 having a contact patch center point 30 being a point on the tire center axis 26. The ground plane 16 intersects the contact patch center point 30 transverse to the tire center axis 26. Specifically, as best shown in FIG. 4, the contact patch center point 30 is the point where the tire center axis 26 and the outer surface 28 of the tire 22 meet the ground plane 16, which is the road or ground when operating the vehicle 12. The first suspension assembly 18 can also include a rim supporting the tire 22, with the rim and the tire 22 cooperating to define a wheel.

Referring to FIG. 2, the first suspension assembly 18 includes a wheel carrier 32 supporting the tire 22. The wheel carrier 32 is shown in phantom lines in FIG. 2 for illustrative purposes only. The wheel carrier 32 supports the wheel, which includes the rim and the tire 22, such that the wheel can rotate about the first axis 24 independently of the wheel carrier 32. Therefore, the wheel carrier 32 does not rotate about the first axis 24.

When the vehicle 12 is braking, a braking force is applied to the tire 22 at the contact patch center point 30 which creates one or more reaction forces through the first suspension assembly 18. To brake the vehicle 12, a brake mechanism can be disposed between the tire 22 and the wheel carrier 32 to slow, stop or prevent rotation of the tire 22 about the first axis 24, and thus, slow or stop movement of the vehicle 12.

Figures 5, 6:
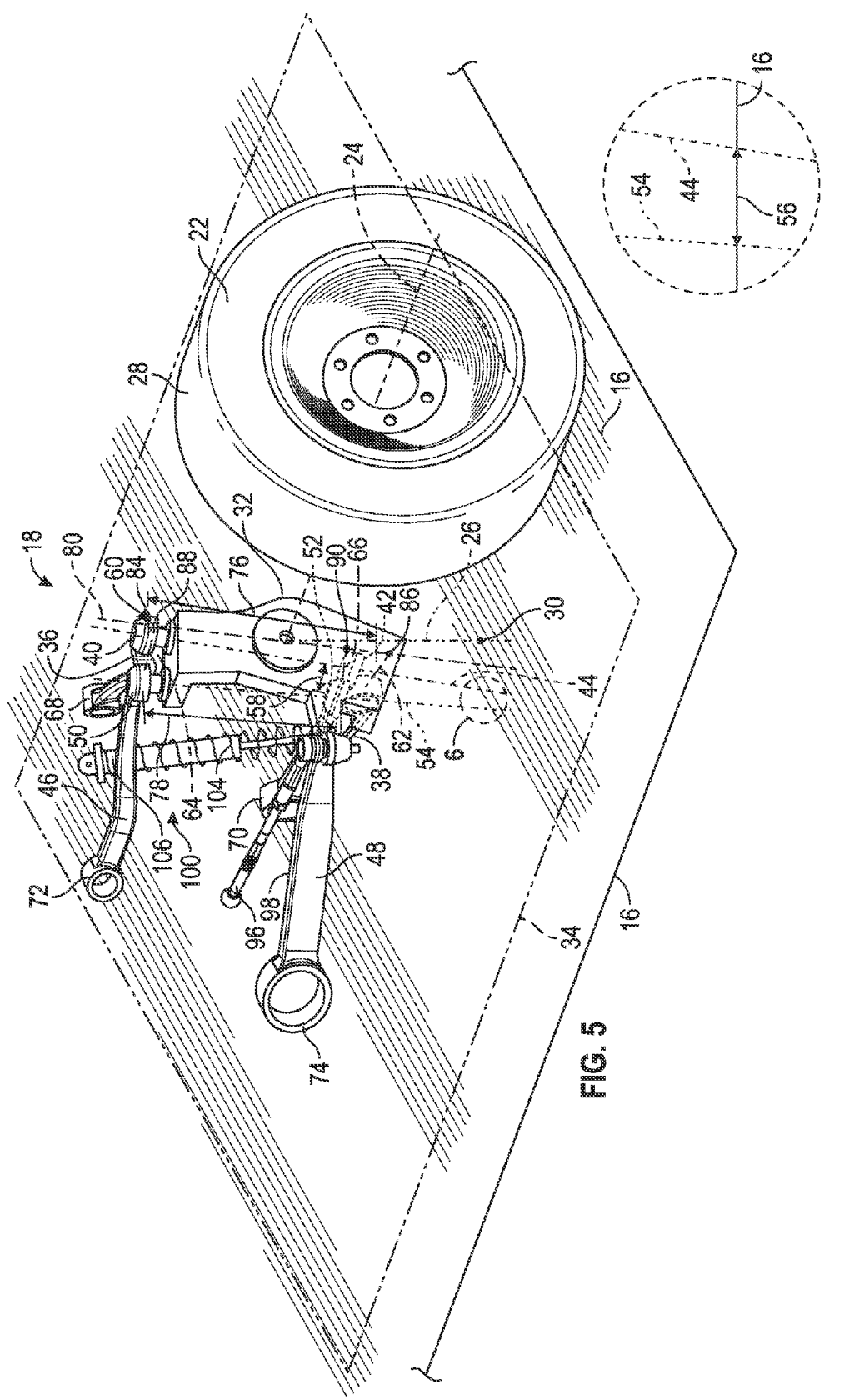
FIG. 5 is a schematic perspective view of the first suspension assembly, with the tire exploded from the assembly.
FIG. 6 is a schematic enlarged view of a handling axis and a ride axis projecting through a ground plane to identify a lateral distance between the handling and ride axes, which is taken from the circled area labeled 6 in FIG. 5.

Referring to FIGS. 2 and 5, a first plane 34 intersects the wheel carrier 32 horizontally through the first axis 24. The first plane 34 splits the wheel carrier 32 into an upper portion and a lower portion. Generally, the lower portion of the wheel carrier 32 is closer to the ground plane 16 than the upper portion of the wheel carrier 32. The first plane 34 can split the wheel carrier 32 into even portions or uneven portions.

Continuing with FIGS. 2 and 5, the first suspension assembly 18 also includes a first handling link 36 and a second handling link 38. The first handling link 36 includes a first distal end 40 coupled to the wheel carrier 32 above the first plane 34. Furthermore, the second handling link 38 includes a second distal end 42 coupled to the wheel carrier 32 below the first plane 34. A handling axis 44 intersects both of the first and second distal ends 40, 42 of the first and second handling links 36, 38 respectively. Generally, the first and second handling links 36, 38 assist in maintaining a stiff front suspension system 10. Additionally, the first and second handling links 36, 38 can counteract loads when the vehicle 12 is cornering, i.e., moving along a curve of the road.

Continuing with FIGS. 2 and 5, the first suspension assembly 18 further includes a first ride link 46 and a second ride link 48. The first ride link 46 includes a third distal end 50 coupled to the wheel carrier 32 above the first plane 34. Furthermore, the second ride link 48 includes a fourth distal end 52 coupled to the wheel carrier 32 below the first plane 34. A ride axis 54 intersects both of the third and fourth distal ends 50, 52 of the first and second ride links 46, 48 respectively. Generally, the first and second ride links 46, 48 assist in providing a smooth ride of the vehicle 12. Additionally, the first and second ride links 46, 48 can counteract loads that are forward and backward (i.e., fore and aft loads), such as when the vehicle 12 is accelerating or braking.

The first, second, third and fourth distal ends 40, 42, 50, 52 can be coupled to the wheel carrier 32 in a ball joint configuration or any other suitable configuration. Regarding the ball joint configuration, for example, the wheel carrier 32 can have a plurality of ball studs attached thereto and the first, second, third and fourth distal ends 40, 42, 50, 52 can each have a socket which respective ball studs are disposed therein. The ball studs can be angled as desired to allow boss clearance.

There is a limited amount of space adjacent to the wheel so the position of the first and second handling links 36, 38 and the first and second ride links 46, 48 can improve performance of the vehicle 12. The first distal end 40 of the first handing link 36 and the third distal end 50 of the first ride link 46 are packaged close together and high on the wheel carrier 32 above the first plane 34 for camber and pitch stiffness. The second distal end 42 of the second handling link 38 and the fourth distal end 52 of the second ride link 48 are packaged close together to maintain camber stiffness and anti-dive. Specifically, offsetting the first handling and ride links 36, 46 relative to each other and/or offsetting the second handling and ride links 38, 48 relative to each other can improve performance of the vehicle 12 as discussed further below.

As best shown in FIGS. 5 and 6, at least one of the first and second ride links 46, 48 is disposed offset from respective first and second handling links 36, 38 to minimize a lateral distance 56 between the handling and ride axes 44, 54 along the ground plane 16 where the handling and ride axes 44, 54 intersect the ground plane 16. As discussed above, the contact patch center point 30 is located where the tire center axis 26 and the outer surface 28 of the tire 22 meet at the ground plane 16. The handling and ride axes 44, 54 intersect the ground plane 16, and between the points where these axes 44, 54 intersect the ground plane 16 is where the lateral distance 56 is located. Therefore, the lateral distance 56 between the handling and ride axes 44, 54 are proximal to the contact patch center point 30 along the ground plane 16.

The phrase "at least one of" should be construed to include non-exclusive logical "or", i.e., at least one of the first ride link 46 or the second ride link 48. Therefore, in certain embodiments, the first ride link 46 is offset from the first handling link 36 or the second ride link 48 is offset from the second handling link 38. In other embodiments, the first ride link 46 is offset from the first handling link 36 and the second ride link 48 is offset from the second handling link 38.

Minimizing the lateral distance 56 can minimize feedback in a steering mechanism when the vehicle 12 is turning. The feedback in the steering mechanism can be caused by tractive forces (i.e., accelerating) and/or braking forces (i.e., decelerating). Therefore, the feedback that a driver can feel in a steering wheel is minimized by this configuration of the front suspension system 10. For example, shutter and/or pull felt in the steering wheel can be minimized by this configuration of the front suspension system 10. Simply stated, undesirable torques in the steering wheel can be minimized with this configuration of the front suspension system 10, which will be discussed further below.

Turning to FIG. 5, the fourth distal end 52 of the second ride link 48 at the ride axis 54 is spaced laterally from the handling axis 44 a distance 58, with the distance 58 being from about 42.0 millimeters (mm) to about 45.0 mm to minimize the lateral distance 56 between the handling and ride axes 44, 54. Minimizing the distance 58 between the fourth distal end 52 of the second ride link 48 at the ride axis 54 and the handling axis 44 minimizes the lateral distance 56 of the handling and ride axes 44, 54 along the ground plane 16 where the handling and ride axes 44, 54 intersect the ground plane 16. As one example, the distance 58 is from about 42.0 mm.

The lateral distance 56 can be minimized by offsetting the second ride link 48 relative to the second handling link 38. For example, as best shown in FIGS. 2 and 5, the second ride link 48 is disposed at least partially above the second handling link 38 in a laterally spaced relationship such that the second ride link 48 is offset from the second handling link 38. Said differently, the second ride link 48 is vertically offset from the second handling link 38. In certain embodiments, the fourth distal end 52 of the second ride link 48 is disposed along the ride axis 54 at least partially above the second distal end 42 of the second handling link 38 in a laterally spaced relationship such that the second ride link 48 is offset from the second handling link 38. By raising the second ride link 48 relative to the second handling link 38, the second distal end 42 can be moved closer to the handling axis 44, which minimizes the lateral distance 56.

Figure 7:
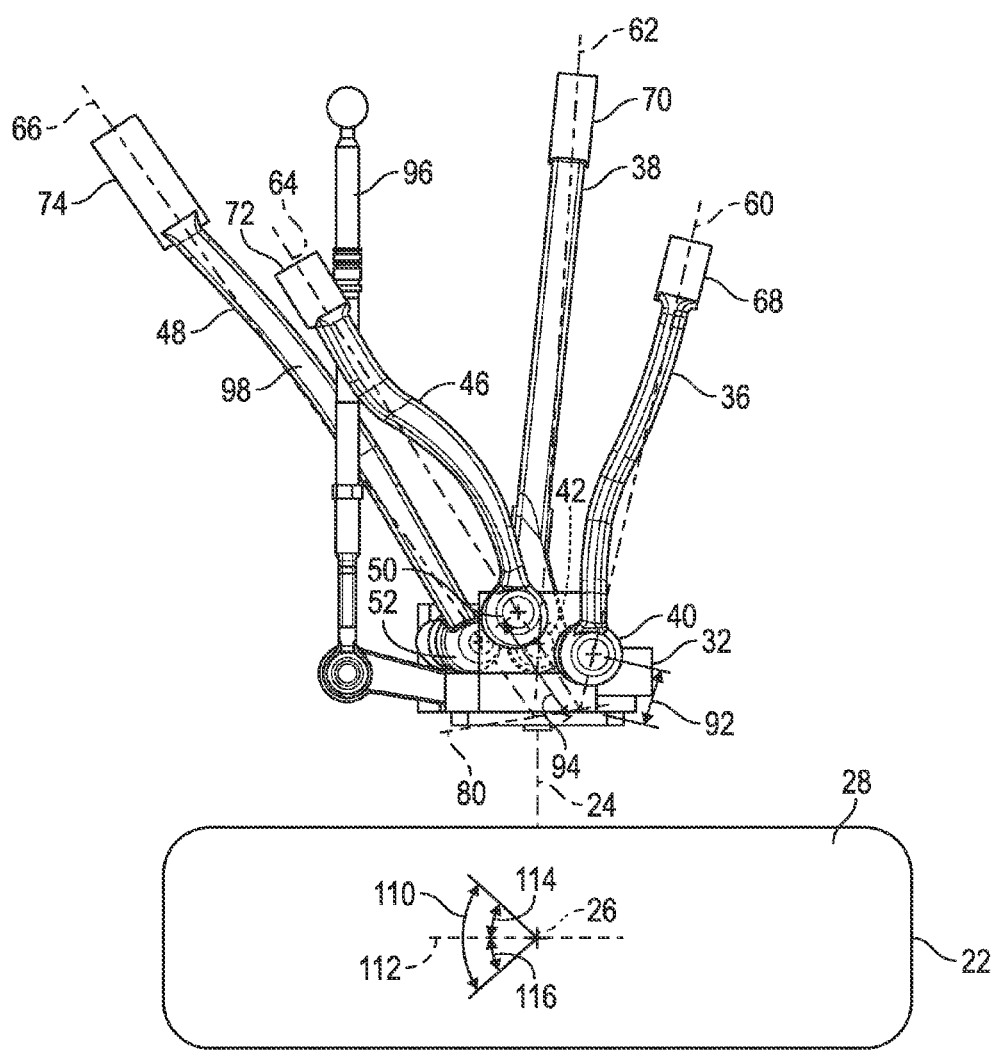
FIG. 7 is a schematic top view of the first suspension assembly, with the tire exploded from the assembly.

Referring to FIG. 7, the first handling link 36 can extend generally along a first link axis 60 and the second handling link 38 can extend generally along a second link axis 62. Additionally, the first ride link 46 can extend generally along a third link axis 64 and the second ride link 48 can extend generally along a fourth link axis 66. Therefore, as best shown in FIG. 5, the fourth link axis 66 is disposed above the second link axis 62 such that the second ride link 48 is offset from the second handling link 38. In certain embodiments, the fourth link axis 66 is disposed above the second link axis 62 such that the fourth distal end 52 of the second ride link 48 is offset from the second distal end 42 of the second handling link 38.

The links 36, 38, 46, 48 can be any suitable configuration. The reference to the links 36, 38, 46, 48 extending generally along respective link axes 60, 62, 64, 66 is to account for the possibility of contours, etc., in the links 36, 38, 46, 48. For illustrative purposes only, the links 36, 38, 46, 48 are shown schematically as being substantially straight in FIG. 2 and the links 36, 38, 46, 48 are shown schematically as being contoured in FIGS. 5 and 7. In certain embodiments, the links 36, 38, 46, 48 can be substantially straight such that the links 36, 38, 46, 48 are coaxial with respective link axes 60, 62, 64, 66. Alternatively, in other embodiments, as shown in FIGS. 5 and 7, the links 36, 38, 46, 48 extend generally along respective link axes 60, 62, 64, 66, i.e., the links 36, 38, 46, 48 are not coaxial with respective link axes 60, 62, 64, 66.

Turning to FIG. 2, the links 36, 38, 46, 48 also each include a proximal end 68, 70, 72, 74 to attach respective links 36, 38, 46, 48 to the structure 14 of the vehicle 12. Specifically, the first handling link 36 can include a first proximal end 68 spaced from the first distal end 40 along the first link axis 60. Similarly, the second handling link 38 can include a second proximal end 70 spaced from the second distal end 42 along the second link axis 62. Furthermore, the first ride link 46 can include a third proximal end 72 spaced from the third distal end 50 along the third link axis 64. Similarly, the second ride link 48 can include a fourth proximal end 74 spaced from the fourth distal end 52 along the fourth link axis 66. Therefore, as shown in FIG. 2, the first, second, third and fourth proximal ends 68, 70, 72, 74 attach respective links 36, 38, 46, 48 to the structure 14. The links 36, 38, 46, 48 are attached to the structure 14 such that the links 36, 38, 46, 48 can rotate at respective proximal ends 68, 70, 72, 74 in response to bumps in the road, steering maneuvers, etc. Furthermore, in certain embodiments, as shown in FIGS. 2 and 7, the first handling link 36 and the first ride link 46 are both shorter in length than the second handling link 38 and the second ride link 48.

As mentioned above, the lateral distance 56 can be minimized by offsetting the first ride link 46 relative to the first handling link 36. For example, as best shown in FIG. 7, the third distal end 50 of the first ride link 46 is spaced at least partially inboard of the first distal end 40 of the first handling link 36 away from the tire 22 in a laterally spaced relationship such that the first ride link 46 is offset from the first handling link 36.

Turning to offsetting the second ride link 48 relative to the second handling link 38, and referring to FIG. 5, the first and second link axes 60, 62 of the first and second handling links 36, 38 respectively can be spaced from each other a first distance 76 along the handling axis 44. Furthermore, the third and fourth link axes 64, 66 of the first and second ride links 46, 48 respectively can be spaced from each other a second distance 78 along the ride axis 54. The second distance 78 is less than the first distance 76 such that the second ride link 48 is offset from the second handling link 38. Specifically, as best shown in FIG. 2, the second ride link 48 is disposed above the second handling link 38 relative to the ground plane 16. In other words, the second handling link 38 is disposed closer to the ground plane 16 than the second ride link 48. Furthermore, the fourth distal end 52 of the second ride link 48 is disposed along the ride axis 54 at least partially above the second distal end 42 of the second handling link 38 in a laterally spaced relationship.

The first and second handling links 36, 38 and the first and second ride links 46, 48 create an imaginary steer axis 80 that can also be referred to as a virtual steer axis. When the wheel carrier 32 pivots to turn the vehicle 12, the imaginary steer axis 80 correspondingly changes and the tire 22 correspondingly pivots about the imaginary steer axis 80. Specifically, as discussed above, the wheel carrier 32 supports the tire 22, and thus, when the steering wheel is rotated, the wheel carrier 32 and the tire 22 pivot accordingly which correspondingly changes the imaginary steer axis 80.

Referring to FIGS. 2 and 5, the imaginary steer axis 80 can extend transverse to the first axis 24 and can be disposed outwardly toward the tire 22 away from the first, second, third and fourth distal ends 40, 42, 50, 52. In other words, the imaginary steer axis 80 is spaced from the handling and ride axes 44, 54 away from the structure 14. Therefore, the imaginary steer axis 80 can be placed proximal to the tire center axis 26 to minimize forces in the steering mechanism due to tractive forces and braking forces. The imaginary steer axis 80 and the contact patch center point 30 are spaced from each other to define a scrub radius 82 (see FIG. 8 which is taken from FIG. 2) where the imaginary steer axis 80 intersects the ground plane 16. Minimizing the lateral distance 56 between the handling and ride axes 44, 54 along the ground plane 16 minimizes changes in the scrub radius 82 when pivoting the tire 22 about the imaginary steer axis 80. Said differently, the lateral distance 56 between the handling and ride axes 44, 54 minimize the scrub radius 82 when pivoting the tire 22 about the imaginary steer axis 80. The imaginary steer axis 80 intersects the ground plane 16, and the scrub radius 82 is identified in FIG. 8 as being located between the contact patch center point 30 and the imaginary steer axis 80 along the ground plane 16.

The tire center axis 26 is shown in two different locations for each tire 22 in FIG. 2 for illustrative purposes. Specifically, the tire center axis 26 is shown through the tire 22 which is exploded from the wheel carrier 32, and in the same figure, the tire center axis 26 is shown as if the tire 22 is coupled to the wheel carrier 32 to illustrate the relationship between the imaginary steer axis 80 and the tire center axis 26 when the tire 22 is coupled to the wheel carrier 32. Similarly, in FIG. 5, the tire center axis 26 is shown as if the tire 22 is coupled to the wheel carrier 32 to illustrate the relationship between the imaginary steer axis 80 and the tire center axis 26 when the tire 22 is coupled to the wheel carrier 32.

The imaginary steer axis 80 changes as the wheel carrier 32 moves to pivot the tire 22 about the imaginary steer axis 80. Therefore, controlling the movement of the imaginary steer axis 80 can control the scrub radius 82. Generally, the scrub radius 82 changes as the tire 22 is pivoted about the imaginary steer axis 80. In other words, when the steering wheel is turned to change the direction that the vehicle 12 is moving, the wheel carrier 32 pivots which correspondingly pivots the tire 22 about the imaginary steer axis 80. As such, the imaginary steer axis 80 changes as the steering wheel is turned. The scrub radius 82 creates a moment arm about the imaginary steer axis 80 that acts on or is transferred to the wheel carrier 32 which then acts on or is transferred to the steering mechanism via the wheel carrier 32. Specifically, the scrub radius 82 creates a side to side moment arm and not a fore-aft moment arm. By controlling the scrub radius 82 when the tire 22 is pivoted about the imaginary steer axis 80, i.e., the vehicle 12 is being steered through a curve or turned, the feedback felt by the driver can be minimized. There is a limited amount of space adjacent to the wheel so the positions of the first and second handling links 36, 38 and the first and second ride links 46, 48 can minimize the scrub radius 82. The scrub radius 82 will be discussed further below.

Turning to FIG. 5, the first link axis 60 can intersect the imaginary steer axis 80 at a first point 84 and the second link axis 62 can intersect the imaginary steer axis 80 at a second point 86. Furthermore, the third link axis 64 can intersect the imaginary steer axis 80 at a third point 88 and the fourth link axis 66 can intersect the imaginary steer axis 80 at a fourth point 90. The fourth point 90 can intersect the imaginary steer axis 80 above the second point 86 such that the second ride link 48 is offset from the second handling link 38. In other words, the second point 86 is disposed closer to the ground plane 16 than the fourth point 90. Therefore, the second ride link 48 is disposed at least partially above the second handling link 38 in a laterally spaced relationship. In certain embodiments, the first and third points 84, 88 intersect the imaginary steer axis 80 at the same location. Alternatively, the first and third points 84, 88 intersect the imaginary steer axis 80 at different locations (see FIG. 2).

Referring to FIG. 7, the first distal end 40 of the first handling link 36 at the handling axis 44 is spaced a first length 92 from the imaginary steer axis 80 along the first link axis 60. The third distal end 50 of the first ride link 46 at the ride axis 54 is spaced a second length 94 from the imaginary steer axis 80 along the third link axis 64. The first length 92 is less than the second length 94 such that the third distal end 50 of the first ride link 46 is offset from the first distal end 40 of the first handling link 36. Therefore, the third distal end 50 of the first ride link 46 is spaced at least partially inboard of the first distal end 40 of the first handling link 36 away from the tire 22 in a laterally spaced relationship.

Referring to FIGS. 2 and 5, the first suspension assembly 18 can also include a tie-rod link 96 coupled to the wheel carrier 32 to turn the wheel carrier 32. The tie-rod link 96 is coupled to a steering rack which is coupled to the steering wheel. Therefore, when the steering wheel is rotated, the steering rack moves, which moves the tie-rod link 96, and movement of the tie-rod link 96 turns the wheel carrier 32 to pivot the tire 22 about the imaginary steer axis 80. In certain embodiments, the tie-rod link 96 crosses over a top 98 of the second ride link 48 (see FIGS. 5 and 7). The tie-rod link 96 can be disposed in any suitable location and orientation to turn the wheel carrier 32. The first and second handling links 36, 38, the first and second ride links 46, 48 and the tie-rod link 96 can be referred to as a 5-link front suspension assembly. Furthermore, the handling links 36, 38 and the ride links 46, 48 can be referred to as control arms.

Additionally, the first suspension assembly 18 can further include a coil-over shock 100 (see FIGS. 2 and 5) attached to the second handling link 38. The coil-over shock 100 is also attached to the structure 14 of the vehicle 12. The coil-over shock 100 dampens movement of the sprung mass of the vehicle 12. In certain embodiments, the coil-over shock 100 is disposed between the first ride link 46 and the first handling link 36. The coil-over shock 100 can include a coupling end 102 attached to the second handling link 38. Generally, the coupling end 102 is spaced from the second distal end 42 of the second handling link 38 and spaced from the wheel carrier 32. The coil-over shock 100 is removed from FIG. 7 for illustrative purposes only.

Continuing with FIGS. 2 and 5, the coil-over shock 100 can each include a coil spring 104 and a piston/rod/cylinder device 106. The coil spring 104 of the coil-over shock 100 at least partially surrounds the piston/rod/cylinder device 106 of the coil-over shock 100. It is to be appreciated that the coil-over shock 100 can include other components and configurations than discussed above.

Turning back to both of the first and second suspension assemblies 18, 20, as mentioned above, these assemblies 18, 20 cooperate with each other. When the vehicle 12 applies the brakes in a turn, it is desirable to control the scrub radius 82 of the front wheels to minimize feedback in the steering wheel. Specifically, pull and/or shudder felt in the steering wheel by the driver is minimized by controlling the scrub radius 82. When substantially equal brake forces are applied to the front tires 22, a similar scrub radius 82 is applied to each front tires 22 which create similar loads in the tie-rod links 96 which generally cancel each other. Therefore, it is desirable that the moment arms created by the scrub radius 82 of the front tires 22 when turning the vehicle 12 and braking (slowing the vehicle 12 down) be generally cancelled to minimize feedback felt by the driver.

Figure 9:
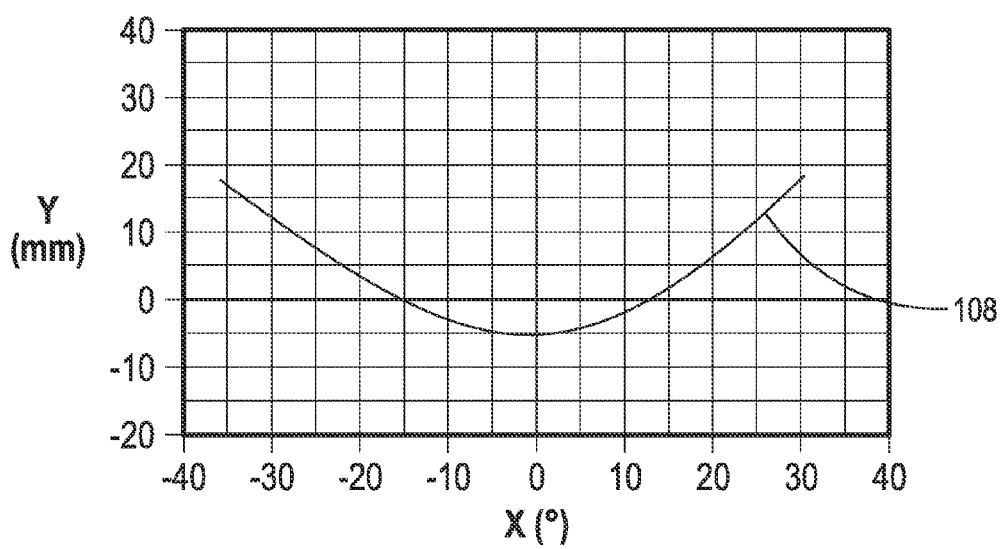
FIG. 9 is a schematic graph of the scrub radius of the pair of tires relative to an angle the tires are pivoted relative to a second plane.

Referring to the graph of FIG. 9, the scrub radius 82 can be various values depending on whether the vehicle 12 is traveling straight, i.e., the tire 22 of each of the first and second suspension assemblies 18, 20 are generally straight, or the vehicle 12 is turning, i.e., the tires 22 of each of the first and second suspension assemblies 18, 20 are pivoted. The scrub radius 82 of each tire 22 changes when respective wheel carriers 32 are pivoted due to the imaginary steer axis 80 of each suspension assemblies 18, 20 changing. In other words, when the steering wheel is turned, i.e., rotated, to change the direction that the vehicle 12 is moving, each of the front tires 22 correspondingly pivot in unison. For example, when the vehicle 12 is turned, one wheel can pivot inside and the other wheel can pivot outside. Generally, the wheel that pivots inside, i.e., inside turn, can be a negative angle 116 and the wheel that pivots outside, i.e., outside turn, can be a positive angle 114.

The graph of FIG. 9 illustrates a curve 108 to identify the relationship between the front tires 22. The y-axis represents the scrub radius 82 of each tire 22 of the front suspension system 10 in millimeters (mm) and the x-axis represents an angle 110 (see FIG. 7) that each tire 22 is pivoted in degrees (°). A second plane 112 as illustrated in FIG. 7 is perpendicular to the first axis 24. In certain embodiments, the second plane 112 intersects the tire center axis 26. The second plane 112 represents when the vehicle 12 is travelling generally straight along the road, and therefore, the front tires 22 are generally straight, i.e., the front tires 22 are generally parallel to each other. The front tires 22 are referred to as being generally parallel to account for camber angles, other variations, etc. between the wheels. FIG. 7 illustrates the angle 110 that the tires 22 can pivot relative to the second plane 112 which include both the inside turn and the outside turn. The angle 110 identifies both the positive angle 114, i.e., outside turn, and the negative angle 116, i.e., inside turn for illustrative purposes.

For the Ackerman correction, in a turn, the front wheels turn at different radiuses. For example, one front wheel moves about a turn at a first radius while another front wheel moves about the turn at a second radius different from the first radius. As such, when the vehicle 12 is turning, the tire 22 that pivots toward the inside of the turn has the angle 110 greater than the other tire 22 because the tire 22 is rotating about a smaller diameter circle. Therefore, the front tires 22 generally do not pivot at the exact same angle 110 when the vehicle 12 is turning.

When the vehicle 12 turns, either left or right, the wheel carrier 32 pivots to change the imaginary steer axis 80 which correspondingly pivots the tire 22 relative to the second plane 112 at the desired angle 110 (the same occurs for the other wheel carrier 32 and other tire 22). For example, when the tire 22 pivots on the inside of a turn such that a front of that tire 22 pivots away from the center of the vehicle 12, the angle 110 can be negative 116. When the tire 22 pivots on the outside of a turn such that a front of that tire 22 pivots toward the center of the vehicle 12, the angle 110 can be positive 114. Therefore, the positive numbers along the x-axis of the graph (FIG. 9) represent when one tire 22 pivots at the positive angle 114 and the negative numbers along the x-axis of the graph represent when the other tire 22 pivots at the negative angle 116. Simply stated, the angle 110 is the negative angle 116 on the x-axis for an inside turn of one tire 22 and the angle 110 is the positive angle 114 on the x-axis for an outside turn of the other tire 22. Continuing with the graph of FIG. 9, the negative numbers along the y-axis represent the negative scrub radius 82 of either tire 22, which occurs when the imaginary steer axis 80 is outboard to the tire center axis 26 (i.e., when the imaginary steer axis 80 is outboard of the tire center axis 26 at the ground plane 16) and the positive numbers along the y-axis represent the positive scrub radius 82 of either tire 22, which occurs when the imaginary steer axis 80 is inboard to the tire center axis 26 (i.e., when the imaginary steer axis 80 is inboard of the tire center axis 26 at the ground plane 16).

It is desirable to cancel the scrub radius 82 related to steering forces between the front tires 22 as mentioned above to minimize feedback felt by the driver. Specifically, by minimizing the difference between the scrub radiuses 82 when the tires 22 are pivoted in unison about the imaginary steer axis 80 of respective tires 22, the feedback felt by the driver can be minimized. Therefore, the configuration of the front suspension system 10 discussed herein minimizes the difference between the scrub radius 82 of the first and second front assemblies 18, 20. Additionally, the configuration of the front suspension system 10 discussed herein creates a generally similar scrub radius 82 between the first and second front assemblies 18, 20 as shown by the curve 108 in FIG. 9. In other words, when the tire 22 of each of the first and second suspension assemblies 18, 20 is pivoted to steer, i.e., turn, the vehicle 12, the scrub radius 82 can change similarly between the tires 22. Simply stated, the curve 108 in FIG. 9 illustrates that the scrub radius 82 is generally symmetrical between the tires 22 when the vehicle 12 is turned.

For example, when the front tires 22 are substantially parallel to each other such that the vehicle 12 can travel straight, the angle 110 of the x-axis is 0 degrees (°) and the scrub radius 82 of the y-axis is about −5.5 mm for each of the front tires 22. As another example, when the front tires 22 are pivoted relative to the second plane 112 to a first turn radius of the vehicle 12, i.e., fully turned steering wheel or maximum rotation of the steering wheel, such that the vehicle 12 can turn left or right, the difference in the scrub radius 82 between the front tires 22 is less than 1.0 mm. For illustrative purposes only, the scrub radius 82 of each of the front wheels at the first turn radius is about 17.0 mm, and thus, the difference between the scrub radius 82 of each of the front tires 22 is less than 1.0 mm, and specifically can be zero in this example.

Again, due to the Ackerman correction, the angle 110 that each wheel turns is different. Therefore, as an example, during an intermediate turn radius of the vehicle 12, i.e., half turned steering wheel or the steering wheel is rotated about half way to the maximum rotation, the tire 22 that is the outside turn has the angle 110 of about 15.0° with a scrub radius 82 of about 2.0 mm and the tire 22 that is the inside turn has the angle 110 of about −18.0° with a scrub radius 82 of about 2.0 mm. Therefore, for illustrative purposes only, the difference between the scrub radius 82 of each of the front tires 22 at the intermediate turn radius is less than 1.0 mm, and specifically can be zero in this example.

The lateral distance 56 between the handling and ride axes 44, 54 of respective first and second suspension assemblies 18, 20 along the ground plane 16 where the handling and ride axes 44, 54 of respective first and second suspension assemblies 18, 20 intersect the ground plane 16 create a difference in scrub radius 82 between each tire 22 of the first and second suspension assemblies 18, 20 of less than 3.0 mm when pivoting each tire 22 in unison about the imaginary steer axis 80 of respective first and second suspension assemblies 18, 20 whether fully rotating the steering wheel or any partial rotation of the steering wheel. Therefore, the difference between the scrub radius 82 of left and right tires 22 are minimized which minimizes the feedback felt by the driver when braking while turning the steering wheel to turn the vehicle 12. The curve 108 identified in FIG. 9 represents that the scrub radius 82 between each tire 22 is generally proportionate for inside/outside turns as the vehicle 12 is turned. Furthermore, the front suspension system 10 discussed herein improves the Ackermann steering correction of the vehicle 12 which minimizes shudder felt in the steering wheel when the vehicle 12 is cornering. For example, this suspension system 10 can achieve a sixty percent or greater Ackerman correction to minimize shudder.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A front suspension assembly for a vehicle, the assembly comprising:
   a tire rotatable about a first axis, with a tire center axis disposed through the tire perpendicular to the first axis, and wherein the tire includes an outer surface having a contact patch center point being a point on the tire center axis, with a ground plane intersecting the contact patch center point transverse to the tire center axis;
   a wheel carrier supporting the tire, wherein a first plane intersects the wheel carrier horizontally through the first axis;
   a first handling link including a first distal end coupled to the wheel carrier above the first plane;
   a second handling link including a second distal end coupled to the wheel carrier below the first plane, with a handling axis intersecting both of the first and second distal ends of the first and second handling links respectively;
   a first ride link including a third distal end coupled to the wheel carrier above the first plane;
   a second ride link including a fourth distal end coupled to the wheel carrier below the first plane, with a ride axis intersecting both of the third and fourth distal ends of the first and second ride links respectively; and
   wherein at least one of the first and second ride links is disposed offset from the respective first and second handling links to minimize a lateral distance between the handling and ride axes along the ground plane where the handling and ride axes intersect the ground plane;
   wherein the first handling link extends generally along a first link axis;
   wherein the second handling link extends generally along a second link axis;
   wherein the first ride link extends generally along a third link axis;
   wherein the second ride link extends generally along a fourth link axis;
   wherein the third link axis is disposed above the second link axis, with the second ride link being offset from the second handling link;
   further including an imaginary steer axis extending transverse to the first axis and disposed outwardly toward the tire away from the first, second, third and fourth distal ends;
   wherein the first link axis intersects the imaginary steer axis at a first point;
   wherein the second link axis intersects the imaginary steer axis at a second point;
   wherein the third link axis intersects the imaginary steer axis at a third point;
   wherein the fourth link axis intersects the imaginary steer axis at a fourth point; and
   wherein the fourth point intersects the imaginary steer axis above the second point such that the second ride link is offset from the second handling link.

2. An assembly as set forth in claim 1 wherein the second ride link is disposed at least partially above the second handling link in a laterally spaced relationship such that the second ride link is offset from the second handling link.

3. An assembly as set forth in claim 1 wherein the third distal end of the first ride link is spaced at least partially inboard of the first distal end of the first handling link away from the tire in a laterally spaced relationship such that the first ride link is offset from the first handling link.

4. An assembly as set forth in claim 1 wherein:
   the first and second link axes of the first and second handling links respectively are spaced from each other a first distance along the handling axis; and
   the third and fourth link axes of the first and second ride links respectively are spaced from each other a second distance along the ride axis, with the second distance being less than the first distance such that the second ride link is offset from the second handling link.

5. An assembly as set forth in claim 1 wherein:
   the imaginary steer axis and the contact patch center point are spaced from each other to define a scrub radius where the imaginary steer axis intersects the ground plane; and
   the lateral distance between the handling and ride axes minimize the scrub radius when pivoting the tire about the imaginary steer axis.

6. An assembly as set forth in claim 1:
   wherein the first handling link extends generally along a first link axis;
   wherein the second handling link extends generally along a second link axis;
   wherein the first ride link extends generally along a third link axis;
   wherein the second ride link extends generally along a fourth link axis;
   further including an imaginary steer axis extending transverse to the first axis and disposed outwardly toward the tire away from the first, second, third and fourth distal ends;
   wherein the first link axis intersects the imaginary steer axis at a first point;
   wherein the second link axis intersects the imaginary steer axis at a second point;
   wherein the third link axis intersects the imaginary steer axis at a third point;
   wherein the fourth link axis intersects the imaginary steer axis at a fourth point;
   wherein the first distal end of the first handling link at the handling axis is spaced a first length from the imaginary steer axis along the first link axis;
   wherein the third distal end of the first ride link at the ride axis is spaced a second length from the imaginary steer axis along the third link axis; and
   wherein the first length is less than the second length such that the third distal end of the first ride link is offset from the first distal end of the first handling link.

7. An assembly as set forth in claim 6 wherein:
   the imaginary steer axis and the contact patch center point are spaced from each other to define a scrub radius where the imaginary steer axis intersects the ground plane; and
   the lateral distance between the handling and ride axes minimize the scrub radius when pivoting the tire about the imaginary steer axis.

8. An assembly as set forth in claim 1 wherein the fourth distal end of the second ride link at the ride axis is spaced laterally from the handling axis a distance, with the distance being from about 42.0 millimeters to about 45.0 millimeters to minimize the lateral distance between the handling and ride axes.

9. An assembly as set forth in claim 1 further including a tie-rod link coupled to the wheel carrier to turn the wheel carrier, with the tie-rod link crossing over a top of the second ride link.

10. An assembly as set forth in claim 1 further including a coil-over shock attached to the second handling link, with the coil-over shock disposed between the first ride link and the first handling link.

11. An assembly as set forth in claim 10 wherein the coil-over shock includes a coupling end attached to the second handling link, with the coupling end spaced from the second distal end of the second handling link and spaced from the wheel carrier.

12. A front suspension system for a vehicle, the system comprising:
   a first suspension assembly;
   a second suspension assembly spaced from the first suspension assembly;
   wherein each of the first and second suspension assemblies includes respectively:
      a tire rotatable about a first axis, with a tire center axis disposed through the tire perpendicular to the first axis, and wherein the tire includes an outer surface having a contact patch center point being a point on the tire center axis, with a ground plane intersecting the contact patch center point transverse to the tire center axis;
      a wheel carrier supporting the tire, wherein a first plane intersects the wheel carrier horizontally through the first axis;
      a first handling link including a first distal end coupled to the wheel carrier above the first plane;
      a second handling link including a second distal end coupled to the wheel carrier below the first plane, with a handling axis intersecting both of the first and second distal ends of the first and second handling links respectively;
      a first ride link including a third distal end coupled to the wheel carrier above the first plane;
      a second ride link including a fourth distal end coupled to the wheel carrier below the first plane, with a ride axis intersecting both of the third and fourth distal ends of the first and second ride links respectively; and
      wherein at least one of the first and second ride links is disposed offset from the respective first and second handling links to minimize a lateral distance between the handling and ride axes along the ground plane where the handling and ride axes intersect the ground plane;
      a coil-over shock directly attached to the second handling link.

13. A system as set forth in claim 12 wherein:
   the first handling link of each of the first and second suspension assemblies extends generally along a first link axis of respective first and second suspension assemblies;
   the second handling link of each of the first and second suspension assemblies extends generally along a second link axis of respective first and second suspension assemblies;
   the first ride link of each of the first and second suspension assemblies extends generally along a third link axis of respective first and second suspension assemblies;
   the second ride link of each of the first and second suspension assemblies extends generally along a fourth link axis of respective first and second suspension assemblies;
   each of the first and second suspension assemblies further include an imaginary steer axis extending transverse to the first axis of respective first and second suspension assemblies and disposed outwardly toward the tire of respective first and second suspension assemblies away from the first, second, third and fourth distal ends of respective first and second suspension assemblies;
   the first link axis of each of the first and second suspension assemblies intersects the imaginary steer axis of respective first and second suspension assemblies at a first point;
   the second link axis of each of the first and second suspension assemblies intersects the imaginary steer axis of respective first and second suspension assemblies at a second point;
   the third link axis of each of the first and second suspension assemblies intersects the imaginary steer axis of respective first and second suspension assemblies at a third point; and
   the fourth link axis of each of the first and second suspension assemblies intersects the imaginary steer axis of respective first and second suspension assemblies at a fourth point.

14. A system as set forth in claim 13 wherein the third link axis of respective first and second suspension assemblies is disposed above the second link axis of respective first and second suspension assemblies and the fourth point of respective first and second suspension assemblies intersects the imaginary steer axis of respective first and second suspension assemblies above the second point of respective first and second suspension assemblies such that the second ride link of respective first and second suspension assemblies is offset from the second handling link of respective first and second suspension assemblies.

15. A system as set forth in claim 13 wherein:
   the first distal end of the first handling link of respective first and second suspension assemblies at the handling axis of respective first and second suspension assemblies is spaced a first length from the imaginary steer axis of respective first and second suspension assemblies along the first link axis of respective first and second suspension assemblies;
   the third distal end of the first ride link of respective first and second suspension assemblies at the ride axis of respective first and second suspension assemblies is spaced a second length from the imaginary steer axis of respective first and second suspension assemblies along the third link axis of respective first and second suspension assemblies; and
   the first length is less than the second length of respective first and second suspension assemblies such that the third distal end of the first ride link of respective first and second suspension assemblies is offset from the first distal end of the first handling link of respective first and second suspension assemblies.

16. A system as set forth in claim 13 wherein:
   the imaginary steer axis and the contact patch center point of respective first and second suspension assemblies are spaced from each other to define a scrub radius where the imaginary steer axis of the first and second suspension assemblies intersect the ground plane; and the lateral distance between the handling and ride axes of respective first and second suspension assemblies create a difference in scrub radius between each tire of the first and second suspension assemblies of less than 3.0 millimeters when pivoting each tire in unison about the imaginary steer axis of respective first and second suspension assemblies.

17. A system as set forth in claim 12 wherein the fourth distal end of the second ride link of respective first and second suspension assemblies at the ride axis of respective first and second suspension assemblies is spaced laterally from the handling axis of respective first and second suspension assemblies a distance, with the distance of respective first and second suspension assemblies being from about 42.0 millimeters to about 45.0 millimeters to minimize the lateral distance between the handling and ride axes of respective first and second suspension assemblies.

18. A front suspension system for a vehicle, the system comprising:

a first suspension assembly;

a second suspension assembly spaced from the first suspension assembly;

wherein each of the first and second suspension assemblies includes respectively:

a tire rotatable about a first axis, with a tire center axis disposed through the tire perpendicular to the first axis, and wherein the tire includes an outer surface having a contact patch center point being a point on the tire center axis, with a ground plane intersecting the contact patch center point transverse to the tire center axis;

a wheel carrier supporting the tire, wherein a first plane intersects the wheel carrier horizontally through the first axis;

a first handling link including a first distal end coupled to the wheel carrier above the first plane;

a second handling link including a second distal end coupled to the wheel carrier below the first plane, with a handling axis intersecting both of the first and second distal ends of the first and second handling links respectively;

a first ride link including a third distal end coupled to the wheel carrier above the first plane;

a second ride link including a fourth distal end coupled to the wheel carrier below the first plane, with a ride axis intersecting both of the third and fourth distal ends of the first and second ride links respectively;

wherein at least one of the first and second ride links is disposed offset from the respective first and second handling links to minimize a lateral distance between the handling and ride axes along the ground plane where the handling and ride axes intersect the ground plane;

wherein each of the first and second suspension assemblies further includes an imaginary steer axis extending transverse to the first axis of respective first and second suspension assemblies and disposed outwardly toward the tire of respective first and second suspension assemblies away from the first, second, third and fourth distal ends of respective first and second suspension assemblies;

wherein the imaginary steer axis and the contact patch center point of respective first and second suspension assemblies are spaced from each other to define a scrub radius where the imaginary steer axis of the respective first and second suspension assemblies intersects the ground plane; and wherein the scrub radius between each tire of the first and second suspension assemblies is generally proportionate to each other.

* * * * *